Figure 1:
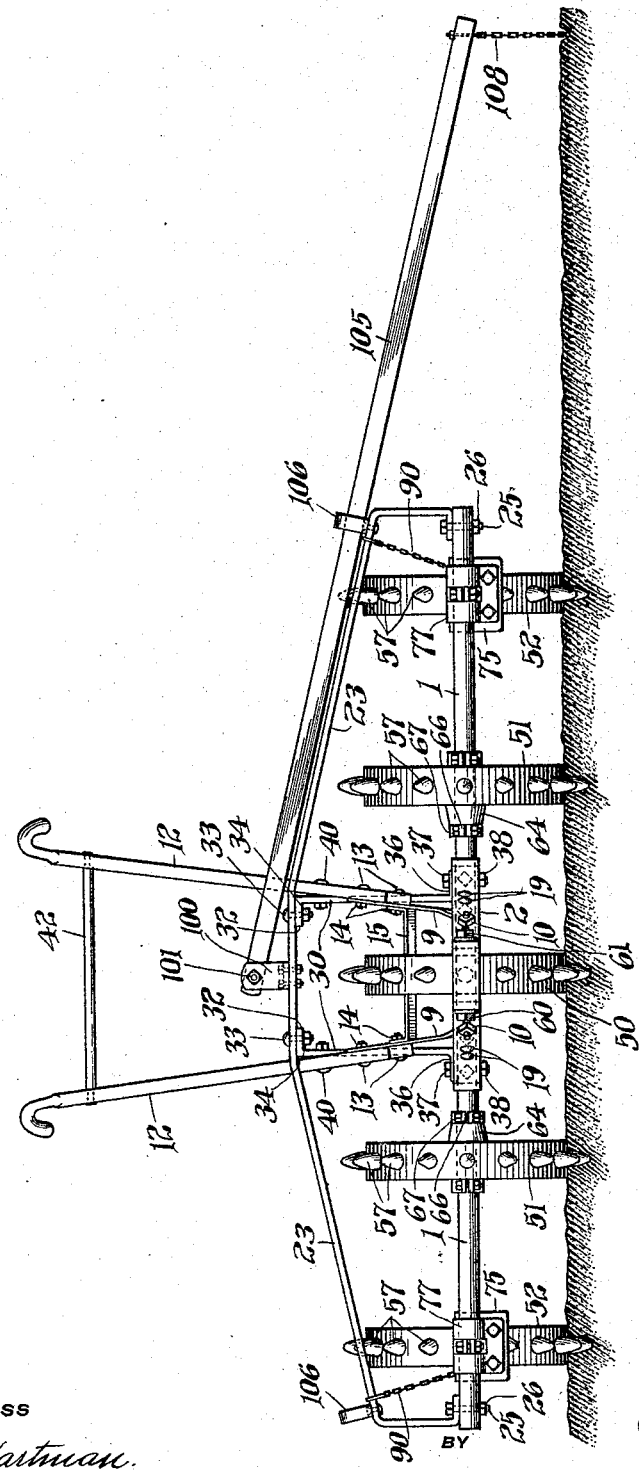

C. J. ALLEN.
AGRICULTURAL IMPLEMENT.
APPLICATION FILED JUNE 30, 1915.

1,185,753.

Patented June 6, 1916.
3 SHEETS—SHEET 1.

WITNESS
F. J. Hartman.

INVENTOR
Charles J. Allen
BY
ATTORNEYS

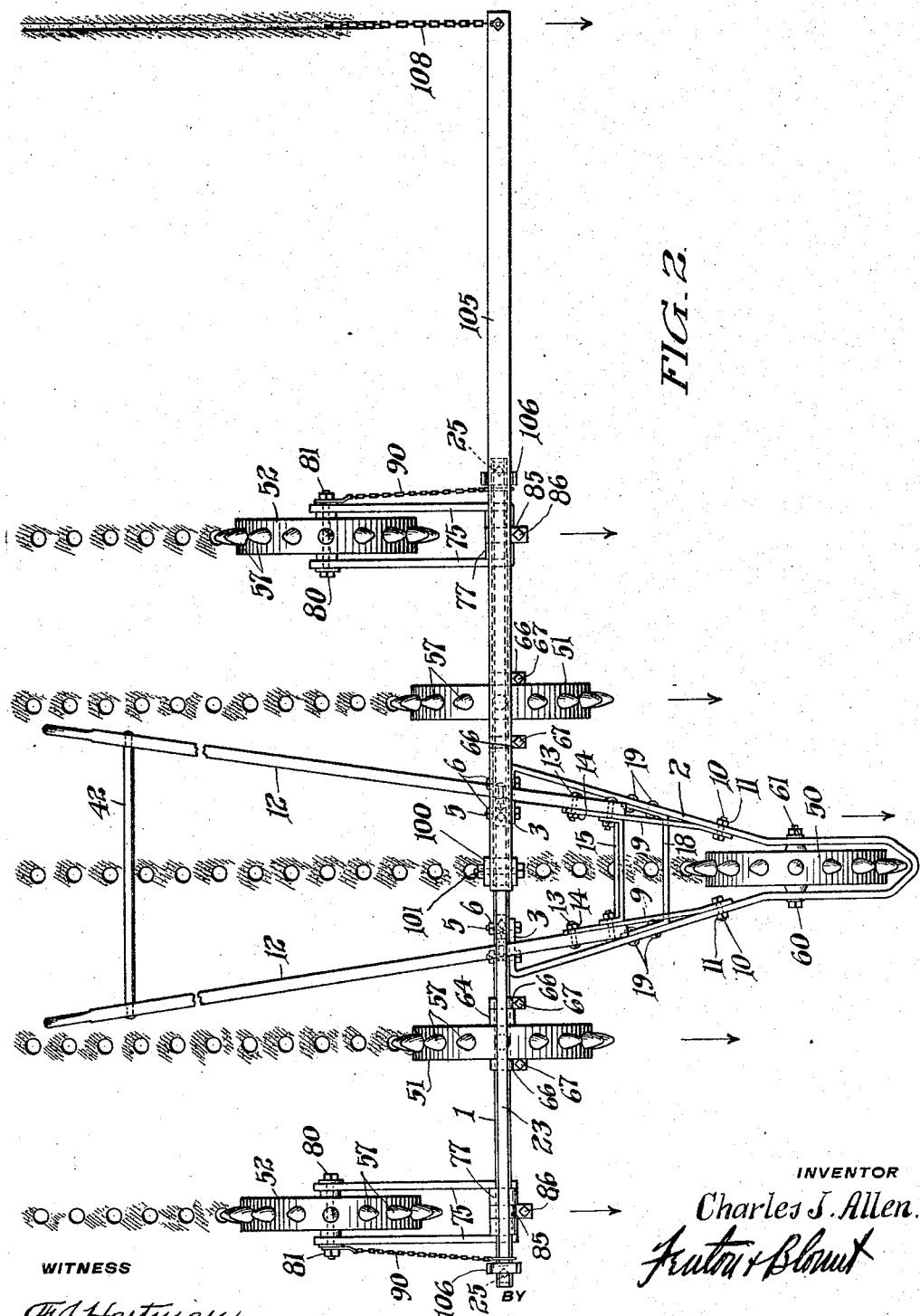

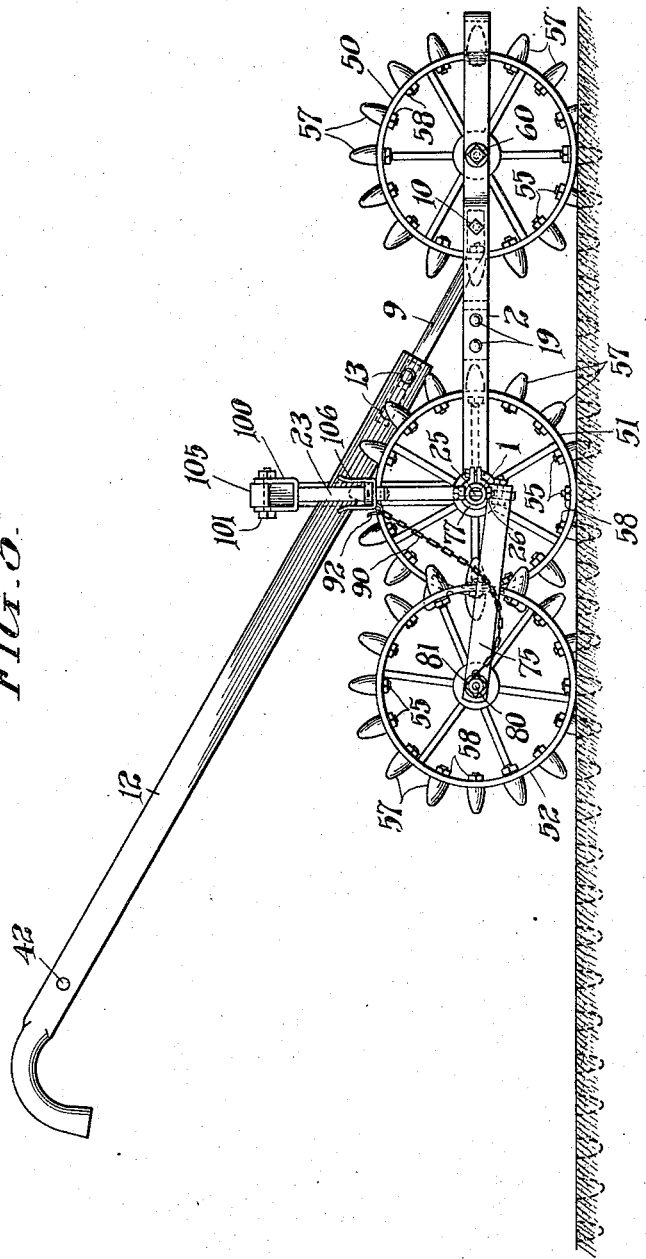

UNITED STATES PATENT OFFICE.

CHARLES J. ALLEN, OF MOORESTOWN, NEW JERSEY.

AGRICULTURAL IMPLEMENT.

1,185,753.  Specification of Letters Patent.  Patented June 6, 1916.

Application filed June 30, 1915. Serial No. 37,155.

*To all whom it may concern:*

Be it known that I, CHARLES J. ALLEN, a citizen of the United States, and a resident of Moorestown, in the county of Burlington and State of New Jersey, have invented a certain new and useful Agricultural Implement, of which the following is a specification, reference being had to the accompanying drawings.

In market gardening and certain kinds of farming it is customary to plant celery, onions, strawberries and the like in parallel rows, the plants being spaced at given intervals from each other, and it has been found that the best results with any given variety may be obtained when the spaces between the rows and the distance between the individual plants in each row are so proportioned that a definite, predetermined number of plants will be set out to the acre or other unit of ground under cultivation. It will be evident that if the plants are set out in such manner that this number is exceeded either through the placing of the rows too closely together or through not leaving sufficient space between the individual plants in each row, that both the labor of planting will be increased unnecessarily and a larger number of plants will be utilized than should be employed to produce the best results; whereas, on the other hand, if the rows are spaced too far apart or the individual plants in each row are too widely separated the maximum production from the given area planted will not be obtained.

A principal object of my invention, therefore, is to provide an agricultural implement suitable for marking out a plurality of parallel rows upon the ground and simultaneously forming in each row so marked a plurality of equidistantly spaced depressions or holes suitable for the reception of the plants or seeds.

Further objects of my invention are to provide an agricultural implement of this character which may be suitably adjusted so as to space the rows at any desired distance, within limits, from each other, and which may be further adjusted to form the holes or depressions in each row either farther apart or closer together as may be desired, so that the exact number of rows and depressions or holes in each row, may be formed in any given piece of ground to produce the best results from the plants to be set out therein as hitherto explained.

Still further objects of my invention are to produce a machine of this character which shall be simple in construction, devoid of intricate or complicated parts, and which may be constructed at a minimum expense.

My invention further includes all of the other various novel features of construction and arrangement hereinafter more definitely specified.

In the accompanying drawings in which is illustrated a preferred form of my invention, Figure 1 is a front elevational view of the device, Fig. 2 a top plan view and Fig. 3 a side elevation of the same.

Referring now to the drawings, that form of the invention illustrated therein may comprise a horizontally extending tubular axle 1, to which is bolted a forwardly extending frame 2 preferably formed of flat steel or other material and having a substantially V-shaped planular outline, the ends of the frame at the upper end of the V being directed inwardly to form suitable lugs 3 adapted for engagement against the outside of the axle 1, suitable bolts 5, provided with nuts 6, and extending through the axle serving to secure the frame firmly thereto. From points substantially midway of the length of the sides of the frame a pair of rearwardly and upwardly directed members 9 extend, and are secured at their lower ends to the frame by the bolts 10 and nuts 11, and at their upper ends to a pair of rearwardly and upwardly directed handles 12, suitable bolts 13 and nuts 14 serving to secure the handles rigidly thereto. If desired a suitable brace 15 may extend between the members 9 adjacent the lower ends of the handle and a similar brace 18 may also be provided between the members of the frame and riveted or otherwise secured thereto as by rivets 19 so that the whole structure forms a strong, well-braced unit.

Extending above and preferably in a substantially vertical plane with the axle is a truss or brace 23 formed preferably of flat steel or the like, the outer ends of which are suitably and removably secured to the ends of the axle as by bolts 25 and nuts 26, the truss extending vertically upward from the axle adjacent each end for a short distance and then being directed upwardly and inwardly on each side to a point adjacent the handles 12, between which it extends approximately parallel to the axle 1. A pair of vertical braces 30 extend between this portion of the truss and the axle, the upper ends of the braces being turned inwardly to form lugs 32 contacting with the truss and secured thereto by bolts 33 and nuts 34, the lower ends being also turned to form lugs 36 secured to the axle by bolts 37 and nuts 38. If desired the braces may be also secured to the handles by suitable bolts or rivets 40 passing through the braces and through the handles, thereby increasing the rigidity of the latter. The handles may also be provided with a transverse brace 42 adjacent their upper extremities.

For the purpose of marking out the rows a plurality of wheels 50, 51 and 52 are provided, these wheels preferably comprising a flat periphery containing a plurality of centrally located radial apertures suitable for the reception of threaded studs 55 formed on the inner ends of the plugs 57, which extend radially outwardly beyond the periphery of each wheel and are secured in position thereon by means of suitable nuts 58 threaded on to the studs 55, and contacting with the inner face of the rim of the wheel. While any desired number of apertures may be provided in each wheel, it is thought that the best results are accomplished when each rim is provided with 16 apertures, thus permitting the employment of 16 plugs when desired, and so forming the depressions in the ground in relatively close proximity to each other. It will be evident, however, that if it be desired to widen the spaces between the plants in any given row, or in all the rows, that certain of the plugs may be removed from the rims of the wheels so that the depressions formed in the ground will be spaced farther apart owing to the greater distance between the plugs remaining in the rims.

In the form of the invention shown in the drawings 5 wheels are employed, the center wheel 50 being permanently mounted within the V-shaped frame 2, and at a considerable distance in front of the axle 1 and midway of its ends by means of a suitable pivot bolt 60 extending horizontally through the frame and secured in position therein by nut 61 or other suitable means and passing through the hub of the wheel thus permitting its free rotation within the frame. On either side of the center line and upon the axle 1 the wheels 51 are adjustably mounted in such manner as to permit of their longitudinal adjustment along the axle, and for this purpose the wheels are provided with suitable hubs 64 through which the axle extends, and at each side of each hub is provided a suitable split clamp 66 extending around the axle and provided with a bolt 67, by means of which the ends of the clamp may be drawn together in such manner as to firmly position it with respect to the axle. It will be evident that by loosening the bolts 67 and moving the clamps outwardly or inwardly along the axle the position of the wheels 51 with respect to the center line of the machine may be altered as desired, and that by tightening the clamps upon the axle the wheels may be adjustably secured at any desired point thereon in such manner that they may rotate freely about the axle, but be prevented from longitudinal movement with respect thereto.

Adjacent each end of the axle 1 is a substantially U-shaped member 75, having rearwardly extending arms, each of the members being provided with an upwardly extending clip 77 rigidly secured thereto and passing around the axle in such manner as to permit of the free vertical oscillation of the member with respect to the axle. Adjacent the outer and rearward ends of the members suitable apertures are provided for the reception of a horizontal pivot bolt 80 secured in position by a nut 81 or other suitable means and extending through the hub of each wheel 52, whereby the wheel is rotatably secured in position between the members at a considerable distance in the rear of the axle 1. For the purpose of adjustably positioning the members and their respective wheels 52 with respect to the axle, a suitable split clamp 85, substantially similar to the clamps 66 previously described and provided with a bolt 86, is positioned within a suitable aperture formed centrally of each clip 77, the clamp extending around the axle and being capable of longitudinal adjustment thereof when the bolt 86 is loosened, and serving to rigidly position the clip 77 and adjacent member 75 thereon at any desired point when the bolt 86 is tightened, to permit the vertical oscillation of each member 75 and adjacent wheel 52 with respect to the axle, while preventing longitudinal movement of the parts with respect thereto except when desired.

A suitable chain 90, secured adjacent the outer end of each member 75, and also to a hook 92 adjacent the truss 23 is provided to limit the amount of oscillation of each member 75, and also to permit of the member being raised sufficiently far to bring the periphery of the wheel 52 entirely out of contact with the ground if desired, in which position the member may be secured by hooking the chain over the hook 92.

Positioned upon the truss 23 and equidistant from the ends of the axle is located a pivot support 100, provided with a horizontal pivot 101 passing through the end of an outwardly and downwardly extending bar or measuring rod 105, a guide 106 being provided adjacent each end of the truss suitable for the reception of this bar and serving to steady the same. Adjacent the outer end of the bar or any other point thereon which may be desired, is secured a piece of chain 108 of a length sufficient to reach the surface of the ground and extend for a short distance thereon in such manner that when the machine is propelled over the surface of the ground the chain will mark thereon a line parallel to the line traced by the wheel 50, so that when the end of the field is reached the machine may be reversed in direction and again propelled over the field, the line traced by the chain 108 serving as a guide to the operator to enable him to keep the new set of rows marked by the machine parallel to the rows previously marked by it. The bar 105 may be readily revolved on the pivot 101 each time the machine is reversed in direction so that it will extend from that side of the machine adjacent the unmarked portion of the field.

The operation of the device which it is believed will be almost self-evident from the foregoing explanation is briefly, as follows: It having been determined just what space it is desired to leave between the plants to be set out in any given row, the plugs 57 in the wheels are arranged either by removing or adding plugs to the periphery of the wheels to produce a proper spacing of the indentations formed by the plugs as the wheels revolve over the ground. The wheels 51 are then adjusted along the axle 1 and positioned thereon by means of the clamps 66, so that the distance between the center line of each wheel and center line of the machine will be equal to the space it is desired to leave between the rows, and the members 75 are also positioned with respect to the axle by means of the clamps 85 so that a similar distance will be left between the center lines of the wheels 52 and the center lines of the wheels 51. The machine is then propelled over the ground manually or otherwise, and is guided by the operator by means of the handles 12, the bar 105 being extended outwardly from the machine toward the unmarked portion of the field with the chain 108 dragging on the ground. It will be evident that the plugs 57 during the rotation of the wheels over the surface of the ground will indent the latter and form suitable spaces for the reception of the plants or seeds to be set out, and that when the end of the field is reached the machine may be turned around and propelled over the unmarked surface of the ground adjacent the portion already marked, the line previously traced by the chain 108 serving as a guide to the operator in directing the course of the machine. Each time that the direction of the travel of the machine is reversed, the bar 105 is also rotated about the pivot 101 so that it will project from the machine in the proper direction to permit the chain 108 to trace still another guiding line on the unmarked portion of the ground, which in turn serves as a guide when the direction of travel is again reversed.

By suitable adjustment of the wheels 51 and 52, the spaces between the rows may be readily varied as desired, and under certain circumstances it may even be found advantageous to temporarily remove the wheels 51 entirely from the axle, or to raise the wheels 52 out of contact with the ground surface by means of the chains 92 as hitherto described, in order to adapt the implement for employment under special conditions which may be encountered in operation.

It will be evident that the passage of the machine over the ground will result in the production of a plurality of equally spaced indentations or depressions in the surface thereof, arranged in a number of exactly parallel rows equidistantly spaced from each other and equal to the number of the wheels employed, and if the distances between the rows and the spaces between the indentations have been properly determined in advance, that exactly the proper number of plants or seeds may thereafter be placed in the indentations to produce the maximum yield from the field without the waste of any plants or unnecessary labor entailed first by setting out the plants too closely together, and secondly, by thereafter having to thin them out to produce the desired spacing. It will furthermore be evident by virtue of the arrangement of the wheels 50 and 51 at substantially the apexes of a triangle that all three will remain in continuous contact with the surface of the ground even though its contour may be somewhat uneven, and that the wheels 52 by reason of their freedom of movement in a vertical plane will also similarly contact with the surface during the movement of the implement, so that all five wheels will have a continuous rolling contact with the surface of the ground at all times, thereby permitting the plugs to produce indentations of equal depth and uniformity throughout the area traversed by the machine. Furthermore, owing to the generally triangular arrangement of the several wheels with the apex of the triangle extended forwardly toward the direction of travel, the implement can be caused to traverse the ground with a minimum amount of effort.

While I have herein described with some particularity a preferred form of my invention, I do not desire to limit myself specifically thereto, as it will be evident that various changes may be made in the details of construction and in the arrangement of the various parts of the device, and that wheels varying in size and number may be employed, and the number of plugs in each

Having thus described my invention, I claim and desire to protect by Letters Patent of the United States:

1. An agricultural implement comprising a horizontally extending axle, a plurality of wheels rotatable on said axle, a wheel centrally located with respect to the ends of said axle and in the same horizontal plane as said first mentioned wheels, and a plurality of wheels in the rear of said axle free to move in a vertical plane with respect to said other wheels.

2. An agricultural implement comprising a horizontally extending axle, a frame in front of said axle and in the same horizontal plane therewith, a wheel mounted in said frame, a plurality of wheels mounted on said axle, and a pair of wheels arranged in the rear of said axle and operative to oscillate in a vertical plane with respect thereto.

3. An agricultural implement comprising a horizontally extending tubular axle, a frame projecting in front of said axle and carrying a marking wheel, a pair of marking wheels mounted on said axle and rotatable with respect thereto, and a second pair of marking wheels mounted in the rear of said axle adjacent the ends thereof and free to oscillate in a vertical plane with respect to said axle and said other wheels.

4. An agricultural implement comprising a horizontally extending axle and a forwardly projecting frame, a marking wheel mounted in said frame, a plurality of marking wheels mounted on said axle and longitudinally adjustable thereon, a pair of U-shaped members extending rearwardly from said axle and longitudinally adjustable thereon, and a marking wheel mounted in each of said members, said members and said last mentioned wheels being free to oscillate in a vertical plane.

5. An agricultural implement comprising a horizontally extending axle, a plurality of marking wheels mounted in the rear of said axle and free to oscillate in a vertical plane with respect thereto, and a marking wheel mounted in front of said axle.

6. An agricultural implement comprising a horizontally extending axle, a plurality of marking wheels mounted in the rear of said axle and free to oscillate in a vertical plane with respect thereto, a marking wheel mounted in front of said axle, and means extending beyond said axle operative to mark the surface of the ground when said implement is propelled thereover.

7. An agricultural implement comprising a horizontally extending axle and forwardly extending frame, a pair of handles extending rearwardly from said frame over said axle, a marking wheel mounted in said frame and having a plurality of radially projecting plugs, a plurality of wheels rotatably mounted on said axle having similar plugs, and a plurality of wheels having similar plugs mounted in the rear of said axle, said last mentioned wheels being free to oscillate in a vertical plane with respect to said first mentioned wheels.

8. An agricultural implement comprising a horizontally extending axle, a forwardly extending frame carrying a marking wheel having a plurality of radially extending plugs, said wheel being equidistantly spaced from the ends of said axle, a plurality of similar wheels longitudinally adjustable of said axle and rotatable thereon, and a plurality of similar wheels in the rear of said axle and longitudinally adjustable with respect thereto, said last mentioned wheels being free to oscillate in a vertical plane with respect to said axle, and means reversible with respect to said axle and extending outwardly therefrom operative to mark the surface over which said machine may be propelled.

9. An agricultural implement comprising a horizontally extending tubular axle, a forwardly extending frame rigidly secured thereto, a marking wheel mounted in said frame centrally of said axle and having a plurality of radially outwardly extending removable plugs, a plurality of similar wheels on said axle laterally spaced from said first mentioned wheel and longitudinally adjustable of said axle, a plurality of similar wheels in the rear of said axle laterally spaced from said wheels on said axle and longitudinally adjustable thereof, said last mentioned wheels being free to oscillate in a vertical plane with respect to said other wheels, a reversible bar extending beyond said axle, means on said bar operative to mark the surface of the ground over which said implement is propelled, and a pair of handles extending rearwardly from said frame and rigidly secured with respect to said axle.

In witness whereof, I have hereunto set my hand this 28th day of June, A. D. 1915.

CHARLES J. ALLEN.